United States Patent
Hamel

[11] 3,793,574
[45] Feb. 19, 1974

[54] AIRCRAFT ADAPTIVE CONTROL SYSTEM

[75] Inventor: Bernard Hamel, Paris, France

[73] Assignee: Societe Francaise D'Equipements Pour La Navigation Aerienne S.F.E.N.A., Yvelines, France

[22] Filed: Feb. 5, 1973

[21] Appl. No.: 329,475

Related U.S. Application Data

[63] Continuation-in-part of Ser. No. 246,539, April 24, 1972, abandoned, Continuation of Ser. No. 38,731, May 19, 1970, abandoned.

[30] Foreign Application Priority Data
May 5, 1969   France............................69.16184

[52] U.S. Cl..................... 318/561, 244/77, 318/584
[51] Int. Cl. ......................................... G05b 13/00
[58] Field of Search ............... 318/561, 584; 244/77

[56] References Cited
UNITED STATES PATENTS

| | | | |
|---|---|---|---|
| 3,216,676 | 11/1965 | Brown et al. .................. | 318/561 X |
| 3,250,898 | 5/1966 | Vasu................................ | 318/561 X |
| 3,428,791 | 2/1969 | Chandos.......................... | 318/561 X |
| 3,456,172 | 7/1969 | Hendrik et al..................... | 318/561 |
| 3,458,784 | 7/1969 | Boskovich......................... | 318/561 |
| 3,412,299 | 11/1968 | Buscher et al...................... | 318/561 |

Primary Examiner—T. E. Lynch
Attorney, Agent, or Firm—Karl W. Flocks

[57] ABSTRACT

A control system for providing automatic compensation of variations in the gain of the controlled member, such as an aircraft control surface, comprising a closed-loop circuit which operates in obedience to a law relating the value of the actuation quantity to the difference between the actual output quantity and the commanded quantity, said law taking the form :

$$\beta'c = - K_1 |y| F (x) - K_2 G (x)$$

where $\beta'c$ is the derivative of the compensation signal ; y is such that $Ty' + y = T\beta'c$, T being a constant ; $F(x)$ and $G(x)$ are functions of said difference and $K_1$ and $K_2$ are predetermined coefficients, said closed-loop circuit including multipliar means, inverting amplifiers, summing means, integrator means, a differentiating circuit and a circuit delivering the absolute value of y, whereby said law is satisfied.

4 Claims, 5 Drawing Figures 3,793,574

AIRCRAFT ADAPTIVE CONTROL SYSTEM

This application is a continuation-in-part application of Ser. No. 246,539 filed Apr. 24, 1972, now abandoned which is a continuation of Ser. No. 38,731 filed May 19, 1970, now abandoned.

The present invention relates to a total regulation control system but more particularly to a control system which provides automatic compensation for the gain in actuation of an aircraft control surface, thereby to ensure stable and accurate control regardless of changes in such gain, by means of a closed multiplier loop which controls the rate of deflection of the control according to the position thereof.

As is well known to the specialist in the art, a derivative-action type of control system renders the corrective action proportional to the variation in error. As the error increases, the corrective action is speeded up; when it diminishes, the corrective action is slowed down and excessive overshoots are thus avoided.

An integral-action type of control system reduces the static error by setting up a corrective action proportional to the time for which the error exists.

By combining a derivative-action control system with an integral-action control system it is accordingly possible, in certain cases, to achieve stable and faithful servocontrol.

In the case, however, of a system for controlling the pitch angle of an aircraft, for instance, the open loop gain continuously varies because of changes in the control surface effectiveness. More specifically, in the case of an aircraft free from open-loop short-period instabilities and equipped with an automatic flight control systems with fixed compensating elements, the closed loop response of the controlled aircraft can be rendered satisfactory by simply maintaining the product M x K substantially constant, where M is the effectiveness of the control surface (the pitching moment resulting from deflection of the elevator, for example) and K is an adjustable gain. This requires that the effeciveness of the control surface be known and that the gain K be adjusted so as to be inversely proportional to said effectiveness.

This invention accordingly relates to a control system which automatically compensates for open-loop variations in the gain of the controlled element, whereby to maintain the closed-loop response of said element satisfactory notwithstanding variations in the open-loop again.

The invention further provides an automatic flight control system which compensates automatically for variations in the effectiveness of the control surface, in order to maintain satisfactory closed-loop response in the system in spite of variations in said effectiveness.

In accordance with this invention, the compensation effect is obtained by means of a special relation linking, an actuating signal ($\beta c$) and the deviation ($s = \theta - \theta c$) of the controlled variable $\theta$ from its desired value $\theta c$, in the form of a general law such that :

$$\beta'c = - K1|y| \, F1(x) - K2.G(x)$$

where $\beta'c$ and $y$ are signals related to the signal $\beta c$ by linear differential equations;

$F1(x)$ and $G(x)$ are two functions of the error signal $x$ and of its derivatives;

$K_1$ and $K_2$ are predetermined positive constants, and $|y|$ is the absolute value of the signal $y$.

The automatic gain compensating servo loop according to this invention includes a multiplier and an integrator included between two operators, and it elimiates variations in gain by controlling the rate of deflection of the control surface with an amount of gain dependent on the position of the control surface itself.

The description which follows of a non-limitative exemplary embodiment, given with reference to the accompanying drawings, will give a clear understanding of how the invention can be carried into practice. In the drawings.

Figure 1:
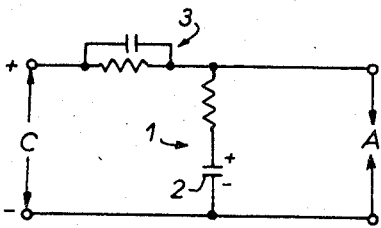
FIG. 1 is a diagram showing a conventional integral-action servo loop.
Figure 2:
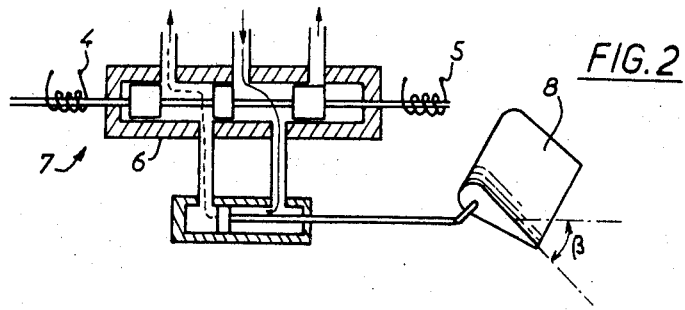
FIG. 2 shows in partial section an aircraft control surface actuator.

FIG. 1 is a classic error-signal feedback circuit provided between the error signal input C and the error signal output to amplifier A. Rapidly varying errors are not taken into account by integrator 1 because the charge in capacitor 2 remains virtually constant during such fluctuations. In contradistinction, derivative circuit 3 stabilizes the servo mechanism in respect of sudden variations in the error. However, if a servomechanism of this kind is provided so that it acts upon control solenoids 4 and 5 (FIG. 2) which, through an autopilot and a slide-valve 6, operate a servocontrol system 7 which determines the angle of incidence B of an elevator 8, then the servo system will be continuously under the direct influence of the elevator gain parameter of the aircraft.

Figure 3:
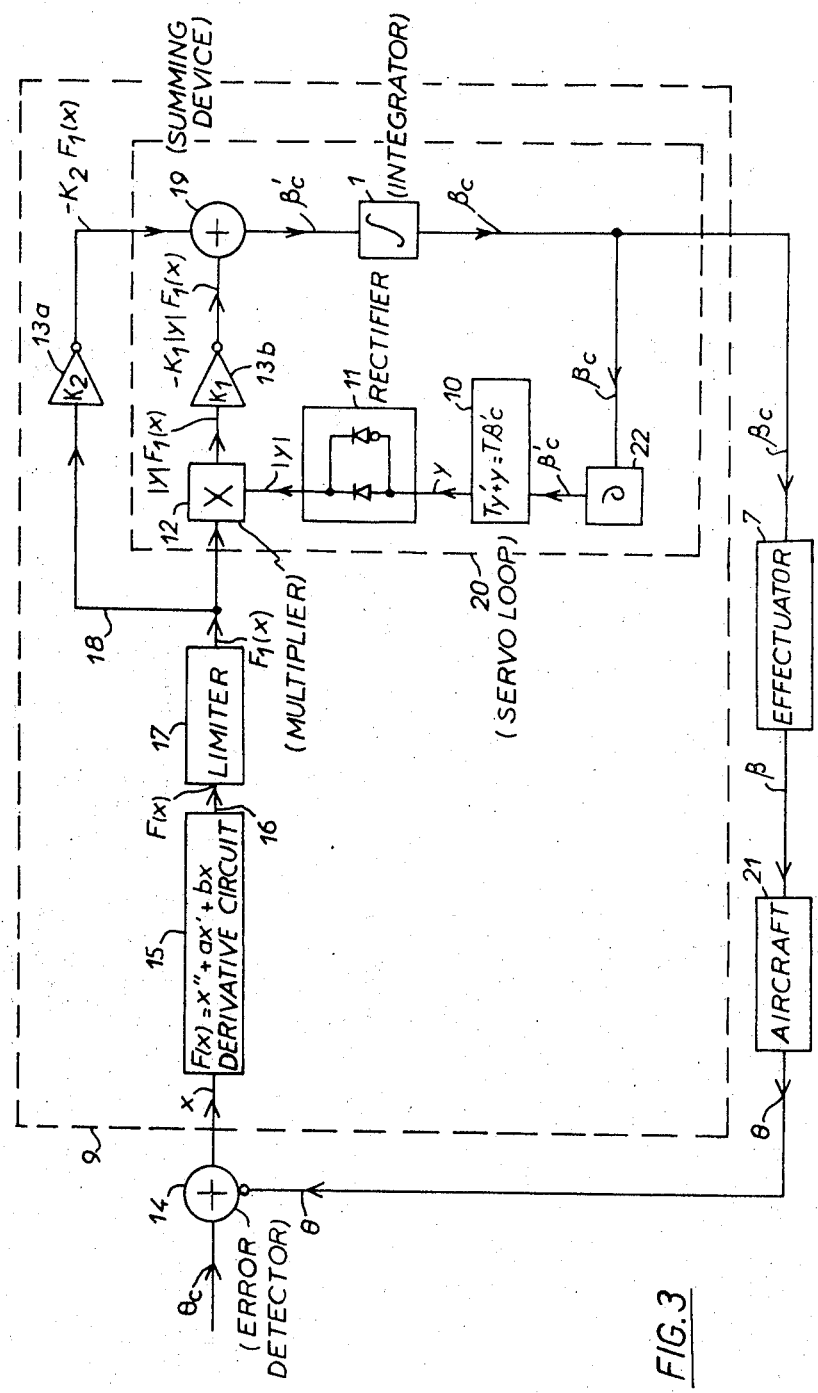
FIG. 3 is a block diagram of a total-regulation servo loop according to this invention.

FIG. 3 shows a block diagram in accordance with this invention, in which a servo system 9 generates a signal $\beta c$ for control surface actuator 7 that depends on the difference $x$ between the commanded angle $\theta c$ and the instantaneous pitch angle $\theta$ of the aircraft 21, and also on a function of the angle B c itself.

The system 9 comprises a closed servo loop 20 according to this invention, from which it will be seen that the rate signal $\beta'c$ entering intergrator 1 is a function of the position signal $\beta c$ issuing therefrom.

As may be seen, when it issues from error detector 14, error signal $x$ is first processed in a derivative circuit 15 and thereafter applied to line 16 as a signal, for example of the form given by the formula :

$$F(x) = x'' + ax' + bx$$

where $x''$ is the second derivative of $x$ with respect to time $t$, $x'$ is the first derivative of $x$ with respect to time $t$ and $a$ and $b$ are constants.

From line 16 the signal $F(x)$ passes through a limiter 17 and is thereafter applied in the form of a clipped signal Fhd 1($x$) to a multiplier 12 of servo loop 20 and to auxiliary line 18, whence, after having been multiplied in an inverting amplifier 13a by a gain constant $-K_2$, it is added in a summing device 19 to the main signal which is multiplied in an inverting amplifier 13b by a gain constant $-K1$.

It will be appreciated that the direct loop 20 according to this invention :

processes the signal $\beta c$ in a differentiating circuit 22 which outputs the signal $\beta'c$ representing the derivative of the signal $\beta c$ with respect to time $t$;

computes, in a circuit 10, a signal $y$ defined by the differential equation $Ty' + y = T\beta'c$, where $y'$ is the derivative of $y$ with respect to time $t$, and T is a constant;

computes the absolute value $|y|$ of the signal $y$ in a circuit 11 possibly formed as shown by an inverter followed by a diode, both of which are parallel-connected to a second diode with the catodes of the two diodes oriented toward the $|y|$ signal output end; and multiplies this absolute value by an $F_1(x)$ factor in multiplier 12.

The signal $B'c$ issuing from summing device 19 thus takes the form :

$$\beta'c = K1 \, |y| \, F1(x) - K_2 F1(x)$$

Obviously, it would alternatively be possible to provide a signal of the following form :

$$\beta'c = K1 \, |y| \, F1(x) \quad K_2 G1(x)$$

In practice, $K_2$ is preferably chosen very small in relation to $K_1$ so that the signal $\beta'c$ is substantially proportional to $|y|$ and thereby inversely proportional to the control-surface effectiveness, in order to make the control system largely independent of the control-surface effectiveness variation related to the angle $\beta$. However, $K_2$ is not equal to zero and, in the event that $|y| = 0$, the control loop will not be cut off, whereby in accordance with the present invention an automatic flight control system equipped with servo loop 20 is assured of very great flexibility and excellent stability in pitch. Conversely, if $K_2 = 0$, the loop generating the signal $\beta'c$ cannot operate and it is therefore necessary that $K_2$ be otherwise than zero, either at all times or when the absolute value of the signal issuing from filter 10 is below a predetermined threshold value.

Manifestly, the various circuits referred to precedingly, in particular the error detector, limiter, multiplier, summing device and integrator, are each well known per se and consequently require no detailed description.

Figure 4:
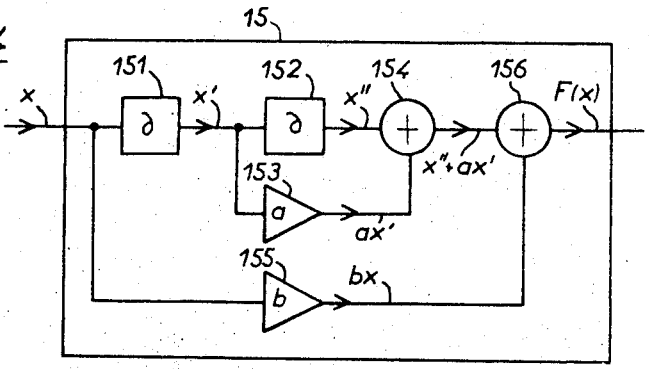
FIG. 4 is a block diagram of a circuit for computing the function $F(x)$.

Referring next to FIG. 4, an example of circuit 15 will be described hereinafter by way of illustration. Circuit 15, which computes the function $F(x) = x'' + ax' + bx$, may include a first differentiator 151, dirven by the signal $x$ and delivering the signal $x'$, a second differentiator 152 driven by the signal $x'$ and delivering the signal $x''$, a first amplifier 153 of gain $a$ receiving the signal $x'$ and delivering the signal $ax'$, a first summing device 154 delivering the signal $x'' + ax'$, a second amplifier 155 of gain $b$ receiving the signal $x$ and delivering the signal $bx$, and a second summing device 156 delivering the desired signal $F(x)$. A circuit of this type is already known per se.

Figure 5:
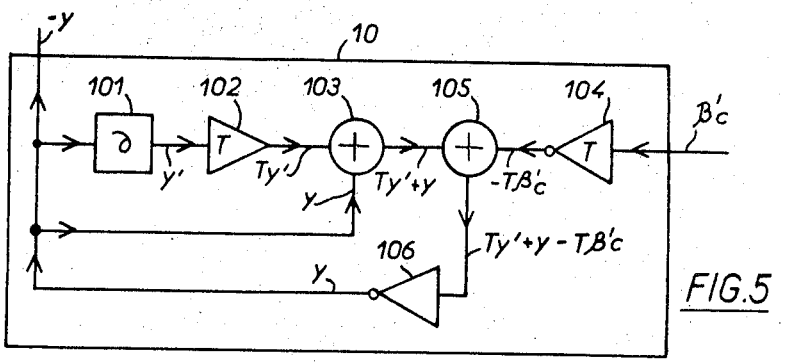
FIG. 5 is a block diagram of a circuit for computing the signal $y$.

Referring next to FIG. 5, the circuit 10 which computes the signal $y$ such that $Ty' + y = T\beta'c$ may include a differentiator 101 driven by the signal $y$ and delivering the signal $y'$, an amplifier 102 of gain T driven by the signal $y'$ and delivering the signal $Ty'$, a summing device 103 delivering the signal $Ty' + y$, an inverting amplifier 104 of gain T driven by the signal $B'c$ and delivering the signal $-T\beta'c$ and a summing device 105 delivering the signal $Ty' + y - T\beta'c$ to an inverting operational amplifier 106 which outputs the signal $y$. Clearly, this circuit 10 has but one state of equilibrium, namely that for which the signal $Ty' + y - T\beta'c$ is equal to zero at the input of operational amplifier 106. Circuits of this type are likewise known to the specialist in the art.

Ig goes without saying that many changes or substitutions may be made in the preferred exemplary embodiment hereinbefore described, without departing from the scope of the invention as set forth in the appended claims.

I claim:

1. A control system for providing automatic compensation of variations in the gain of the controlled member, applicable for actuating an aircraft control surface having a control surface actuator and drift sensing circuits, comprising a closed-loop circuit which operates in obedience to a law relating the value of the actuation quantity to the difference between the actual output quantity and the commanded quantity, in which said closed loop includes multiplier means for multiplying the signal proportional to said difference, inverting amplifiers of said signal and of the output signal from said multiplier, summing means for summing the signals issuing from said amplifiers, integrator means for integrating the output signal from said summing means, a differentiating circuit for delivering the derivative of said output signal with respect to time, a circuit driven by said derivative and delivering an output signal $y$ such that :

$Ty' + y = T\beta'c$, where $\beta'c$ is said derivative and T is a constant, and a circuit for delivering the absolute value $|y|$ of said signal $y$ to said multiplier means, the output from said integrator means controlling said actuator the deflection angle imparted by which is related to the pitch angle of the aircraft, the general law taking the form :

$\beta'c = K_1 \, |y| \, F(x) - K_2 G(x)$ where $x$ is the difference between the actual position of the control surface and its commanded position, $F(x)$ is a function of $x$ $G(x)$ is a second function of $x$ and $K_1$ and $K_2$ are predetermined positive coefficients of said amplifiers, $K_2$ being smaller than $K_1$.

2. A system as claimed in claim 1, in which a circuit computes said function $F(x)$ according to the equation :

$F(x) = x'' + ax' + bx$ where $x''$ is the second-derivative of said signal $x$, $x'$ is the first-derivative of said signals $x$, and $a$ and $b$ are constants.

3. A system as claimed in claim 1, in which a limiting circuit processes said function $F(x)$, which accordingly enters the equation $\beta'c = K \, |y| \, F_1(x) - K_2 G(x)$ under the limited form $F_1(x)$.

4. A system as claimed in claim 1, in which said function $G(x)$ is equal to said function $F_1(x)$, whereby the equation becomes :

$\beta'c = K_1 \, |y| \, F_1(x) - K_2 F_1(x)$.

* * * * *

UNITED STATES PATENT OFFICE
CERTIFICATE OF CORRECTION

Patent No. 3,793,574      Dated February 19, 1974

Inventor(s) Bernard HAMEL

It is certified that error appears in the above-identified patent and that said Letters Patent are hereby corrected as shown below:

Title page, under "Foreign Application Priority Data", the date should read May 19, 1969.

Signed and sealed this 16th day of July 1974.

(SEAL)
Attest:

McCOY M. GIBSON, JR.
Attesting Officer

C. MARSHALL DANN
Commissioner of Patents